Nov. 30, 1965     J. H. HOFFMANN     3,221,195
CORE FOR DYNAMOELECTRIC MACHINES
Filed Nov. 24, 1961
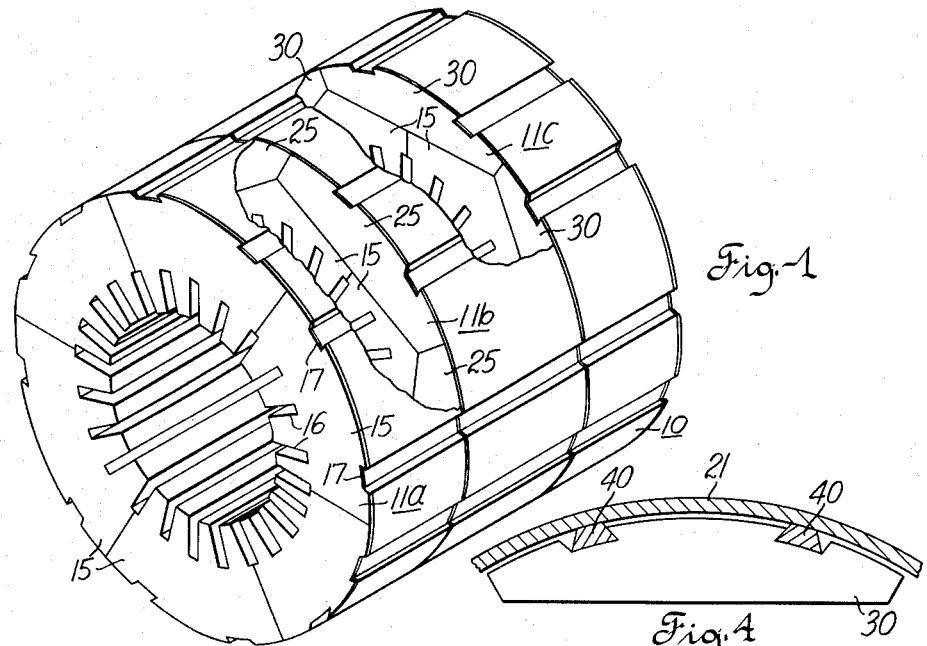
Fig. 1
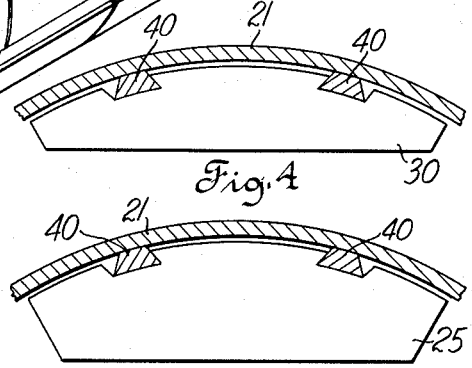
Fig. 4
Fig. 3
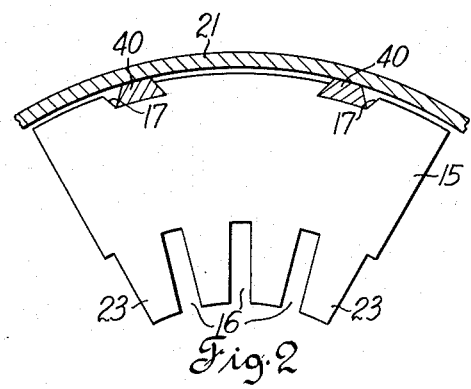
Fig. 2
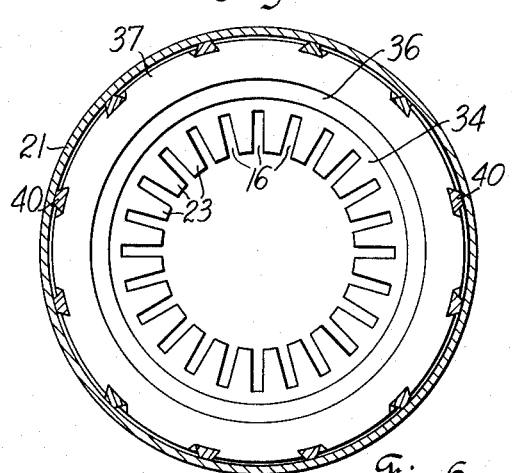
Fig. 6
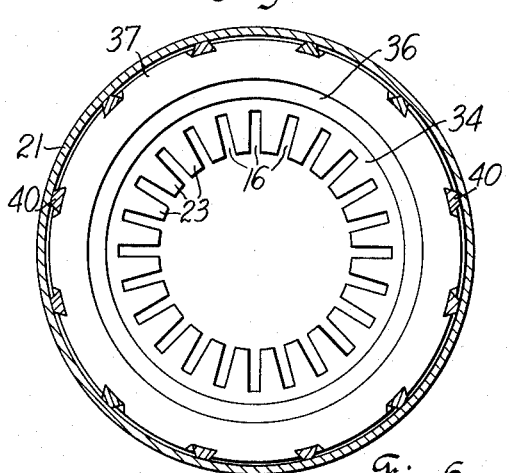
Fig. 5
Inventor
Jack H. Hoffmann
By Robert B. Benson
Attorney United States Patent Office 3,221,195
Patented Nov. 30, 1965

3,221,195
CORE FOR DYNAMOELECTRIC MACHINES
Jack H. Hoffmann, West Allis, Wis., assignor to Allis-Chalmers Manufacturing Company, a corporation of Milwaukee, Wis.
Filed Nov. 24, 1961, Ser. No. 154,641
5 Claims. (Cl. 310—179)

This invention relates generally to dynamoelectric machines. More specifically this invention relates to cores of large turbo-generators.

In the cores of large turbo-generators, which are made up of numerous iron laminations, there is usually a build-up of material in some parts of the core causing an unequal overall length of the core. This build-up of material is due to uneven coatings of varnish on the laminations and more particularly to burrs and other irregularities in the laminations caused by the shearing action in forming winding slots in the laminations. When these cores are completely assembled they are seasoned by heating and compressing them. This removes a large portion of the irregularities in the individual laminations but the remaining irregularities frequently cause the core to have a significant differential length between its inner and outer portions.

In actual practice there has been as much as ¾ inch length differential between the inner and outer portions of the core having an overall length of less than 90 inches. This difference in length makes it an extremely difficult job to securely clamp the laminations firmly together. Because the laminations are not firmly clamped together they tend to vibrate during operation creating an excessive amount of noise. These vibrations of the laminations further loosen the core thereby increasing the amplitude of vibration of the individual laminations which results in greater noise and disturbance. This chain reaction continues and often results in the core producing an unacceptable noise volume.

This invention overcomes the problems cited above by forming the core member from laminations having different radial lengths. By inserting shorter laminations intermittently between the regular laminations, the overall length of the core can be made uniform. This makes the clamping of the core much easier and provides a firmer more compact core. This in turn reduces the amount of vibration in the individual laminations thereby reducing the noise made by the generator during operation. Furthermore, by having a more compact, firmly clamped core initially, it is much less likely that the core will loosen excessively during operation.

Therefore, it is the object of this invention to provide a new and improved core for dynamoelectric machines.

Another object of this invention is to provide a new and improved core for dynamoelectric machines having a more uniform overall length.

Another object of this invention is to provide a new and improved core for dynamoelectric machines that can be more easily and firmly clamped.

Other objects and advantages of this invention will be apparent from the following description when read in connection with the accompanying drawings, in which:

FIG. 1 is a pictorial view with sections removed of a stator core having the laminations of this invention;

FIG. 2 is a front view of a primary lamination of this invention;

FIG. 3 is a front view of a secondary lamination of this invention;

FIG. 4 is a front view of a tertiary lamination of this invention;

FIG. 5 is a front view of a set of laminations of FIG. 2 arranged to form an annular lamination member for a dynamoelectric machine; and FIG. 6 is a front view of an alternate set of laminations with the secondary and tertiary laminations superimposed on a primary lamination.

Referring more specifically to the drawings by characters of reference this invention is illustrated in a stator core 10 for a large turbo-generator. The core 10 is made up of a series of stacked lamination rings 11a, 11b, 11c that are clamped together in the usual manner. Each ring 11 is made up of a set of independent sections which are arranged to form an annular ring.

In the primary lamination rings each section or individual lamination 15 is somewhat trapezoidal in shape and has a series of slots 16 formed in its radially inner portion and grooves 17 in its outer portion for receiving dovetailed projections from the yoke. The inner slots are aligned with the slots of other laminations in the core and form a receptacle for the electrical windings of the machine which are positioned in the slots 16 after the core has been formed. The grooves 17 in the outer portions are used for aligning the laminations and mounting them in the outer casing or yoke 21 of the generator.

The core 10 of this invention is made up of principally the primary laminations 15 described above but has interspersed throughout the core some sets of secondary laminations 25 having a shorter radial length. These laminations 25 are illustrated in FIG. 3 and have a radial length which is less than the distance between the outer edge of the primary lamination 15 and the bottom of the slots 16 at the radial inner portion of the lamination. The reason for this particular length is that the maximum amount of lamination build-up is in the area of the teeth 23 forming the slots 16 where during the shearing operation in forming these laminations there is formed a large number of burrs and other irregularities in the laminations which are not compressed into the plane of the laminations during assembly. The secondary laminations 25 when judiciously interspersed throughout the length of the core, balance out the build-up due to the lamination irregularities at the inner portion of the core and provide a finished core having a substantially uniform overall length.

In some cores, especially the longer ones, it may be desirable to intersperse in the core periodically a third group of laminations 30 having an even shorter radial length than the secondary laminations. These shorter tertiary laminations 30 (shown in FIG. 4) provide an even more compact and uniform core when used in conjunction with the other two sets of laminations 15, 25. This is because the length of the core tends to decrease gradually from the top of the slots 16 to the outer edge of the core with the shortest portion of the core at the extreme outer diameter. Hence, by inserting some secondary laminations for adding length in the area from the slots outward and using a few shorter tertiary laminations in the outer portion of the core only, the overall length of the core is more uniform throughout. This provides a more compact core having fewer voids which in turn reduces the amount of vibration in the laminations. Furthermore, if only secondary laminations are used to supplement the primary lamination, in some cases the inner and outer lengths of the core would be equal but the length at the middle of the core would be greater. This of course could create some of the problems this invention is trying to solve. More than three different sizes of laminations can be used but in most cases the additional benefits to be gained by so doing would not be worth the added expense and effort.

It is obvious that this overall length differential could occur in cores made up of annular laminations 34 such as shown in FIG. 6. In such a core the secondary laminations 36 are annular in shape rather than trapezoidal but again would have a radial length less than the distance between the outer edge and the bottom slots of the primary laminations 34. The specific length of the secondary laminations may vary in some cases but should be sufficient to provide a core having a substantially uniform overall length but without having too many spaces between laminations which will allow the laminations to vibrate excessively during the operation of the machine. A tertiary set of laminations 37 may also be used in such a core if desired.

In operation, the laminations are stacked in a shell or yoke with grooves 17 engaging complementary dovetail bars 40 on the yoke. The core is made up of primary laminations with secondary and/or tertiary laminations interspersed periodically throughout the core as needed to provide the overall uniform length. In practice the ratio of primary laminations to secondary and/or tertiary laminations varies but is usually between 75 to 1 and 100 to 1. The core is stacked in a vertical position and a group of secondary laminations are occasionally positioned on top of a group of primary laminations to make the surface of the core at that point level. By continually repeating this process throughout the building of the core, the core has an equal overall length and the secondary laminations are uniformly distributed throughout the core. After the core has been stacked, the laminations are clamped together and seasoned. Then the core is finally clamped and prepared ready to receive electric conductors in the slot portions 16.

Although but two embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A core for a dynamoelectric machine comprising: a plurality of substantially trapezoidal shaped laminations, said laminations being combined to form annular lamination rings, said lamination rings being aligned and stacked, secondary laminations of substantially trapezoidal shape having a shorter radial length than said primary laminations, said secondary laminations being combined to form annular lamination rings and being interspersed with said primary lamination rings, said laminations being clamped together to form a core for a dynamoelectric machine having a substantially uniform overall length.

2. A core for a dynamoelectric machine comprising: a plurality of substantially trapezoidal shaped laminations having slots at their inner end, said laminations being combined to form annular lamination rings, said lamination rings being aligned and stacked, secondary laminations of substantially trapezoidal shape having a shorter radial length than said primary laminations, said secondary laminations being combined to form annular lamination rings and being interspersed with said primary lamination rings, tertiary laminations of substantially trapezodal shape having a radial length less than the radial length of said secondary laminations, said tertiary laminations being combined to form annular lamination rings interspersed with the other said lamination rings, said laminations being clamped together to form a core for a dynamoelectric machine having a substantially uniform overall length.

3. A core for a dynamoelectric machine comprising: a plurality of substantially trapezoidal shaped laminations having slots at their inner end, said laminations being combined to form annular lamination rings, said lamination rings being aligned and stacked, secondary laminations of substantially trapezoidal shape having a radial length less than the distance between the outer edge and the bottom of said slots in said primary laminations, said secondary laminations being combined to form annular lamination rings and being interspersed with said primary lamination rings, said laminations being clamped together to form a core for a dynamoelectric machine having a substantially uniform overall length.

4. A core for a dynamoelectric machine comprising: a plurality of substantially trapezoidal shaped laminations having slots at their inner end, said laminations being combined to form annular lamination rings, said lamination rings being aligned and stacked, secondary laminations of substantially trapezoidal shape having a radial length less than the distance between the outer edge and the bottom of said slots in said primary laminations, said secondary laminations being combined to form annular lamination rings and being interspersed with said primary lamination rings, tertiary laminations of substantially trapezoidal shape having a radial length less than the radial length of said secondary laminations, said tertiary laminations being combined to form annular lamination rings interspersed with the other said lamination rings, said laminations being clamped together to form a core for a dynamoelectric machine having a substantially uniform overall length.

5. A core for a dynamoelectric machine comprising: a plurality of primary laminations stacked to form an annular core, a plurality of secondary laminations having varying radial lengths less than the radial length of said core, said secondary laminations being interspersed with said primary laminations to form a core having a substantially uniform overall length.

References Cited by the Examiner
UNITED STATES PATENTS

| | | | |
|---|---|---|---|
| 1,538,196 | 5/1925 | Livingston | 310—216 X |
| 1,816,795 | 7/1931 | Pohl | 310—256 |

ORIS L. RADER, *Primary Examiner.*

DAVID X. SLINEY, *Examiner.*